United States Patent
Nasr-Azadani et al.

(10) Patent No.: US 12,511,554 B2
(45) Date of Patent: Dec. 30, 2025

(54) COMPLEX SYSTEM FOR END-TO-END CAUSAL INFERENCE

(71) Applicant: Accenture Global Solutions Limited, Dublin (IE)

(72) Inventors: Mohamad Mehdi Nasr-Azadani, San Francisco, CA (US); Rachael Victoria Phillips, Berkeley, CA (US); Teresa Sheausan Tung, Tustin, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 991 days.

(21) Appl. No.: 17/350,840

(22) Filed: Jun. 17, 2021

(65) Prior Publication Data

US 2022/0405614 A1    Dec. 22, 2022

(51) Int. Cl.
    *G06N 5/04*     (2023.01)
(52) U.S. Cl.
    CPC ........................................ *G06N 5/04* (2013.01)
(58) Field of Classification Search
    CPC ....................................................... G06N 5/04
    See application file for complete search history.

(56) References Cited

U.S. PATENT DOCUMENTS

2019/0034814 A1*    1/2019    Amer ........................ G06F 18/24
2020/0401915 A1*    12/2020    Tung ......................... G06N 5/04

OTHER PUBLICATIONS

Emmanuel, Tlamelo, Thabiso Maupong, Dimane Mpoeleng, Thabo Semong, Banyatsang Mphago and Oteng Tabona, "A survey on missing data in machine learning", 2021, Springer, pp. 3-20 (Year: 2021).*

Gavankar, Sachin and Sudhirkumar Sawarkar, "Decision Tree: Review of Techniques for Missing Values at Training, Testing and Compatibility", 2015, IEEE, p. 124 (Year: 2015).*

Donders, A. Rogier T., Geert J.M.G. van der Heijden, Theo Stijnen and Karl G.M. Moons, "Review: A gentle introduction to imputation of missing values", 2006, Elsevier, p. 1088 (Year: 2006).*

* cited by examiner

*Primary Examiner* — Shahid K Khan
*Assistant Examiner* — Skylar K Vanwormer
(74) *Attorney, Agent, or Firm* — Mannava & Kang, P.C.

(57) ABSTRACT

A causal inference stack implements a targeted maximum likelihood scheme to conduct causal analysis of the observational data. At a data-handling layer, the causal inference stack obtains one or more memory locations for a dataset and establishes analysis nodes to setup localized data handling for the memory locations. At a data classification layer, the causal inference stack characterizes the missingness of the dataset. At a pipeline layer, the causal inference stack obtains a data element dependency query from a user and sets up an end-to-end solution path to determine the presence of a causal relationship between data elements identified in the data element dependency query.

20 Claims, 4 Drawing Sheets

COMPLEX SYSTEM FOR END-TO-END CAUSAL INFERENCE

TECHNICAL FIELD

This disclosure relates to coordinating multiple worker nodes for distributed calculation.

BACKGROUND

Rapid advances in electronics and communication technologies, driven by immense customer demand, have resulted in the widespread adoption of analytical computing. As one example, analytical computing processes involve up to exabytes (or more) of data every year. Improvements in analytical computing execution will continue to increase the features and options available to operators of analytical computing operations.

DETAILED DESCRIPTION

In various instances, a computational system may be used perform a data analysis such as a targeted maximum likelihood scheme, which may be used to infer a causal relationship between two or more data elements (e.g., causal variable and outcome variable) in a dataset. However, because of computational complexity and large data volumes involved in some targeted maximum likelihood schemes such calculations may occupy computing resource for significant periods. Accordingly, schemes to improve the efficiency and accuracy of the underlying hardware performing the analysis can shorten overall calculation time.

The techniques and architectures discussed work to improve the operational efficiency and accuracy of underlying hardware performing targeted maximum likelihood calculations, by comparing competing estimator model outputs post calculation to ensure that the model used provides a competitive accuracy level relative to the execution time required for the estimator. When a competing estimator outperforms a currently instated model, the system may replace the currently instated estimator to provide a performance boost to the underlying hardware.

The techniques and architectures discussed work to improve security features of the calculation hardware. In some cases, the targeted maximum likelihood calculations performed by the hardware may use sensitive data to perform the analysis. Accordingly, technological security measures may be required to comply with data handling regulations and policies. The techniques and architectures discussed provide for establishment of an analysis node tied to the memory location of at least a portion of the dataset being analyzed.

The analysis node may implement localized data handling. Localized data handling may include execution of a privacy policy. For example, a privacy policy may require that data be encrypted before remote transfer. In an example, a privacy policy may require that data be anonymized or translated into privacy-preserving categorical data. Anonymized data may be de-associated with a subject name and given an anonymized identifier such as internally used subject number (or other strings). Other anonymization schemes may be used (e.g., cryptographic schemes, pseudonymizing schemes, or other schemes). Privacy-preserving categorical data may translate private data for a subject and translate it into a larger category (such as a range, genus, or other grouping) that may be sufficient for the analysis, but protective of individual privacy. For example, a specific age in years may be translated into a multiple-year age range—an age such as 22 years may be translated into a range such as 18-24 years. Similarly, a specific medical condition may be described as a member of a class of conditions. In addition, translation into privacy-preserving ranges may streamline calculation (e.g., through of reduction of used variable bits) and improve the operation and/or the accuracy of the underlying calculation hardware.

Localized data handling may include localized data analysis. For example, the analysis node may execute at computation hardware localized to the memory location as a worker node. In an example, a system implements a gradient descent calculation, regression calculation, or other machine learning calculation on a dataset (e.g., a global dataset) using a coordination node including coordination circuitry that coordinates multiple worker nodes to create a distributed calculation architecture. In some cases, the worker nodes each hold a portion of the dataset and operate on their respective portion. In some cases, the gradient descent calculation, regression calculation, or other machine learning calculation is used, together with targeted maximum likelihood scheme for causal inference estimation. The targeted maximum likelihood scheme may be used to conduct causal analysis, manage bias or other sampling features of the dataset. Thus, the use of localized data handling may allow existing technological privacy protections in place at the original memory location to remain active in protecting the data because the need to transfer the data may be obviated.

In some cases, data available in one location (e.g., logical location and/or physical location) may not necessarily be available in another location (or any other location). For example, data may be private, sensitive, and/or proprietary. In some cases, data may be impossible, expensive or impractical to transfer (e.g., large datasets (potentially many terabytes in size or larger)). Nevertheless, the data may be analyzed to gain valuable insights. In some cases, those insights may be even more accurate if combined with data available at a second location. In various cases, there may be multiple "partition" datasets where for any given location at least one of the multiple dataset partitions is not available. As an illustrative example, each partition may include unique data such that for any given data entry it may only be accessible via its respective worker node. Non-availability may be more than an instance of non-local storage. Rather, non-availability may include true non-accessibility of the data from the location (whether the access attempt is local or remote). Accordingly, by supporting a causal analysis on a global dataset that is a union of these dataset partitions, the architectures and techniques discussed herein provide a technical solution to the technical problem of applying computerized causal analysis on data where the authority applying the computerized causal analysis lacks access to various portions of the dataset being analyzed.

In some cases, a coordination node may coordinate multiple worker nodes to perform localized computing on their respective dataset partitions. The coordination node may (in an iterative process) manage model convergence and/or dataset bias through a parameter provision and feedback system as discussed below. In various scenarios, bias may be present in one or more forms. For example, bias may be present in a dataset, an estimator, the outcome variable of the causal study, or other forms. The system may address bias in various forms.

However, the coordination node may rely on the worker nodes to perform the portions of the analysis involving dataset interaction. The worker nodes may then feedback the analysis results rather than the underlying data itself. Accordingly, the underlying data need not necessarily be moved or remotely accessed by a singularly controlled computational entity. Rather, the data may remain unmoved while a global dataset analysis is performed. In other words, an analysis is performed on the dataset 'globally' as if the distributed dataset was stored in one location. In some implementations, worker nodes may send partial result to the coordination node. The coordination node may aggregate the partial results into a global analysis. In various implementations, worker node/coordination node groups such as those discussed in U.S. patent application Ser. No. 16/906,759, which is incorporated by reference herein, may be implemented. In various implementations therein, a coordination node control the convergence of the analysis based on feedback from the worker nodes. Further, in various implementations therein, a coordination node may maintain the integrity of the analysis along with interpretation of the 'global analysis' for the user. In various implementations a coordination node may be used to coordinate the convergence of one or more models or variables. For example, the coordination node may be used to coordinate the convergence of virtually any AI or machine learning model fit on distributed data. For example, the coordination node may be used to coordinate the convergence of the outcome variable of a causal study (e.g. an average treatment effect) computed locally by each local node.

The techniques and architectures discussed may work to improve calculation reliability and rigor. For example, the system may classify the quality of data based on a missingness metric. A missingness metric may be a measure of the data expected to be present within the dataset (e.g., based on data structural and/or conceptual features) that is missing. The missingness metric may include quantity and distribution measures of the missingness of the dataset. When the missingness exceeds certain tolerances (e.g. percentage of missing records w.r.t. total data records), the system may reduce the allowed analyses (e.g., the allowed end-to-end solution paths) to ensure that the outputs derived from the analyses are supportable by the data.

In an example, the system may work to improve calculation reliability and rigor by confirming that one or more predicate conditions is present for the data elements for which a causal relationship is being investigated. For example, the system may confirm the positivity assumption within covariates in the dataset. In other words, the system may confirm that subjects in the groups where some causal variable of interest (e.g., treatment, exposure, condition) is present are comparable to the group where the same variable is absent. In an example medical context, this may include confirming that the populations with and without a given trait have some overlapping propensity for the given trait (e.g., the presence of the trait is not perfectly predicted by some other variable). Covariates may include variables in the dataset that may affect the outcome variable other than the causal variable being investigated.

In an example, a predicate condition may include temporality. For example, the system may confirm that a potential causal data element is present at the time (or at least sometime prior to) the outcome data element.

In an example, the predicate condition may include a coarsening-at-random-condition. For example, the system may confirm that after covariates accounted for that the members of the group exposed to the causal variable would, on average, have the same outcome as members of the group unexposed to the causal variable if the members had the same exposure. In other words, the coarsening at random condition confirms that there are no additional confounding variables not accounted for in the covariates (or any such additional confounding variables with effects above a given threshold or tolerance).

In an example, a predicate condition may include confirmation that there are no other versions of the causal variable that are unaccounted for in the data. In the example of the medical field, this may include an unaccounted for competing treatment for a condition.

In an example, the predicate condition may include a confirmation that application of the causal variable to one subject does not affect outcomes for another subject. As an illustrative example from the medical context, this predicate condition may be equivalent to a condition that application of a medical treatment to one patient (e.g., a subject) does not affect the odds that the same treatment is successful in another patient. In a more specific illustrative medical example, a vaccine study may select participants that live in separate house, to avoid a situation where the vaccination of a first participant lowers the disease exposure likelihood of another co-housed participant.

Figure 1:
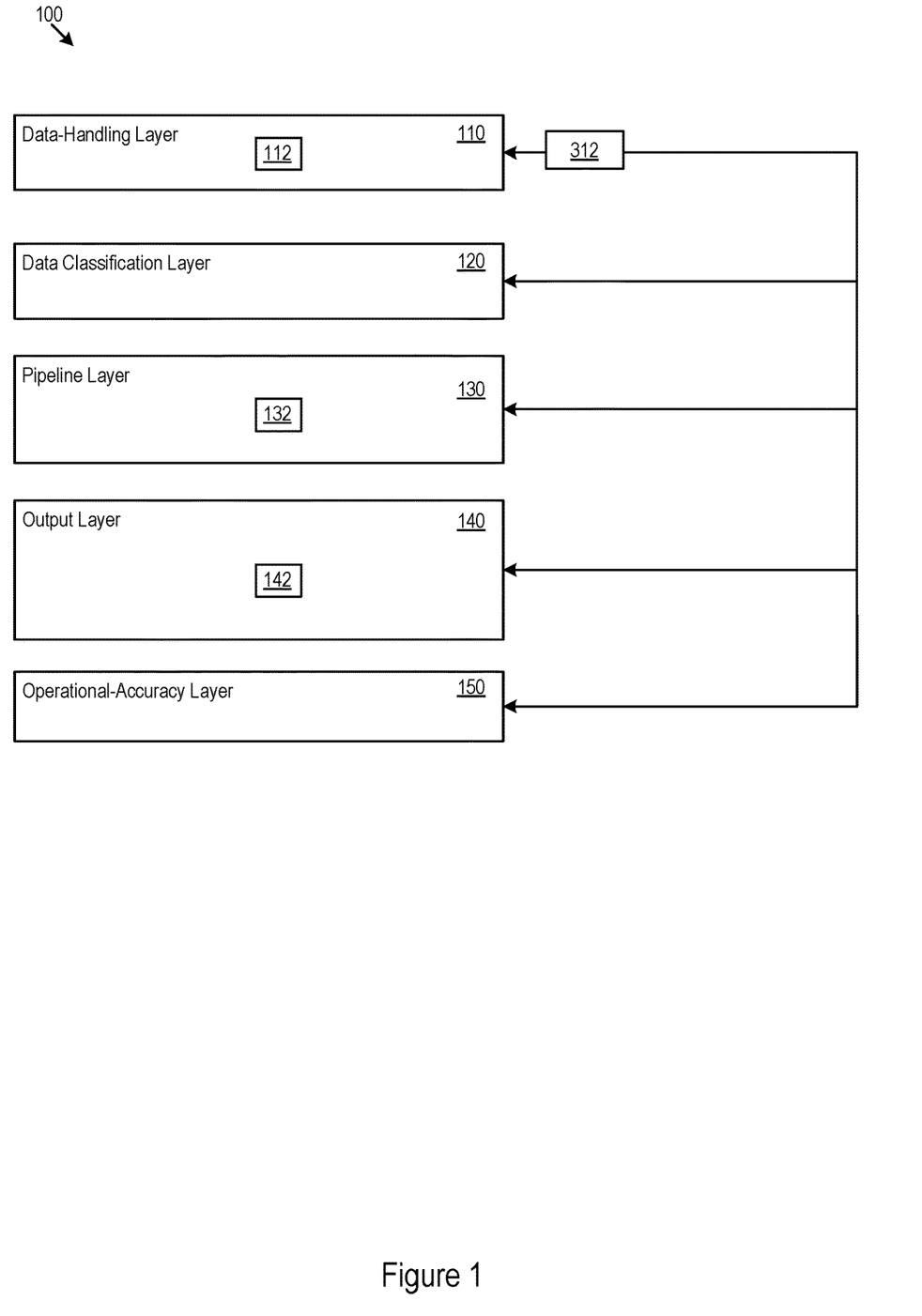
FIG. 1 shows an example causal inference stack.

Referring to FIG. 1, an example causal inference stack (CIS) 100 is shown. The example CIS 100 may include a data-handling layer 110, a data classification layer 120, a pipeline layer 130, an output layer 140, and/or an operational-accuracy layer 150. The data-handling layer 110 may handle treatment of data and/or initiate localized data handling via an analysis node, for example via network interface circuitry hardware (e.g., supplied by communication interfaces 312, discussed below). The data classification layer 120 may determine a missingness metric for the dataset. The pipeline layer 130 may implement an end-to-end solution path for determination of the causal relationship. The output layer 140 may generate an output indicative of the causal relationship determined as a result of completion of the end-to-end solution path using a first estimator. The first estimator is a model used to account for the effects of the covariates to facilitate isolation and determination of the effect of the causal variable being tested. The operational-accuracy layer may compare the output obtained using the first estimator to that obtained using other estimator. For example, the comparison may be made for accuracy (e.g., based on test data) and/or performance (e.g., calculation convergence speed).

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the CIS 100, the data-handling layer 110 may provide the data classification layer 120 with access to hardware-based data-handling operations. Hence, the data-handling layer 110 may provide a hardware resource, e.g., hardware-based data-handling operations, to the data classification layer 120. Accordingly, the multiple-layer stack architecture of the CIS 100 may improve the operation of the underlying hardware of the system.

Figure 2:
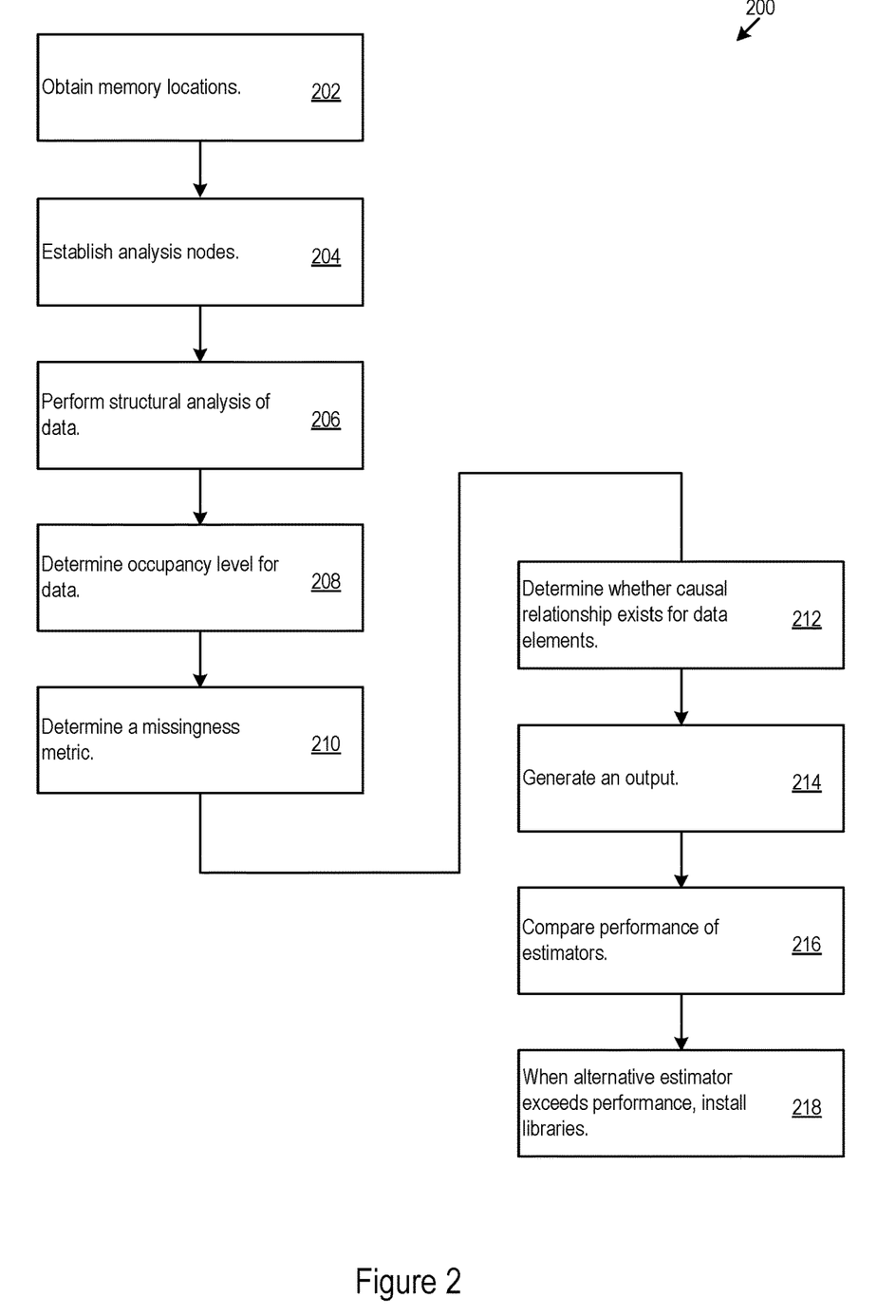
FIG. 2 shows example causal inference logic.

While continuing to refer to FIG. 1, reference is now made to FIG. 2 showing example causal inference logic (CIL) 200 which may be executed by hardware (e.g., causal inference circuitry) to implement the layers of the CIS 100.

At the data-handling layer 110 of the CIS 100, the CIL 200 may obtain memory locations for one or more portions of a dataset (202). For example, a user may specify a particular dataset and one more locations (e.g., which may include remote storage locations) where the contents of the dataset are stored. In some cases, the dataset may be distributed over multiple physical and/or logical locations. In some case, the dataset may be unified at a single location.

The CIL 200 may establish analysis nodes for the one or more memory locations (204). The analysis nodes may implement localized data handling for the memory locations. The localized data handling may include logically localized handling, for example the localized data handling may include enforcement of privacy policies specific to the individual memory locations, but the execution of the analysis nodes may be on hardware physically co-located with that for the CIL 200. Other configurations of logical localization (e.g., data-handling rule zones) may be implemented. The localized data handling may also include physical localization. For example, the analysis node may execute on hardware physically co-located with the memory location, e.g., for distributed analysis and/or pre-transfer privacy policy enforcement.

As discussed above, data-handling may include local data analysis execution and/or privacy policy enforcement. In some case, privacy policy enforcement may also include sending notifications (e.g., system messages for terminal display, emails, text messages, or other messages) to the user indicating the presence of private data. The notification may alert the user to a requirement to take appropriate precautions to avoid data breach.

At the data classification layer 120, the CIL 200 may perform a structural analysis of the data to determine expected entry locations (206). The CIL 200 may identify expected entry locations based on comparisons between entry rows/columns or other structural features to determine which data fields a value should be expected. For example, in some cases, a completely empty column may produce no expected entry locations because the field represented by the column are empty in all cases. In an example, a partially filled column may produce an expected entry location for each field contained therein. Accordingly, such a partially filled column may generate some occupied expected entry locations and some unoccupied entry locations. The CIL 200 may track the unoccupied entry locations to determine an occupancy level for the dataset (208). Based on the occupancy level (e.g., number of missing entries) and/or the distribution of the unoccupied entry locations the CIL 200 may determine a missingness metric for the dataset (210). The missingness metric may include a randomness classification for the missingness of the dataset. The missingness may be classified as missing at random (MAR) for missing entries with correlations below a given threshold, classified as missing completely at random (MCAR) for uncorrelated missing entries, missing not at random (MNAR) for missing entries with a correlation above a given threshold.

At the pipeline layer 130, the CIL 200 may execute an end-to-end solution path to determine whether there is a causal relationship between the causal data element and an outcome data element (212). The decision tree executes as a workflow that is shaped by the characteristics of the dataset including the missingness metric, the covariates represented in the variables in the dataset, and a data element dependency query provided by the user probing the relationship between the causal data element and an outcome data element.

After shaping the end-to-end solution path based on the dataset characteristics, the execution of the end-to-end solution path operates to provide a series of prompts to the user to properly format the data element dependency query, which may be initially posed informally. The prompts may aid the user in specifying, to the CIL 200, the causal and outcome data elements in the dataset.

Based on the query and the missingness metric, the CIL 200 may continue to execute the end-to-end solution path to identify/extract covariates from the dataset and select an estimator (e.g., a model for handling the covariates). The CIL 200 may use other factors to shape execution of the end-to-end solution path such as positivity assumptions, and Based on the data element dependency query and estimator, the CIL 200 may, at the output layer 140, complete the end-to-end solution path by modeling the covariates, verifying that the predicate conditions exist, and/or generating an output indicating the extent to which a causal relationship between the causal and outcome data elements exists (214). The CIL 200 may also generate statistical rating regarding the reliability of the output, such as a confidence interval for the output or other statistical indicator of quality.

At the operational-accuracy layer 150, the CIL 200 may compare the performance of the estimator used to generate the output to performance metrics (e.g., such as statistical ratings, convergence rate, and/or other performance metrics for accuracy and/or speed) from one or more alternative estimators (216). When an alternative estimator exceeds the performance of an implemented estimator (e.g., by a performance threshold buffer), the CIL 200 may initiate installation of one or more libraries or other components to support implementation of the alternative estimator (218). In various implementations, statistical ratings may be determined based on plasmode simulations (e.g., simulations based on available data) to establish a 'truth' baseline for the outcome. The simulations may compare various estimator outputs to the truth baseline. e.g., by calculating a cross-validated risk.

Figure 3:
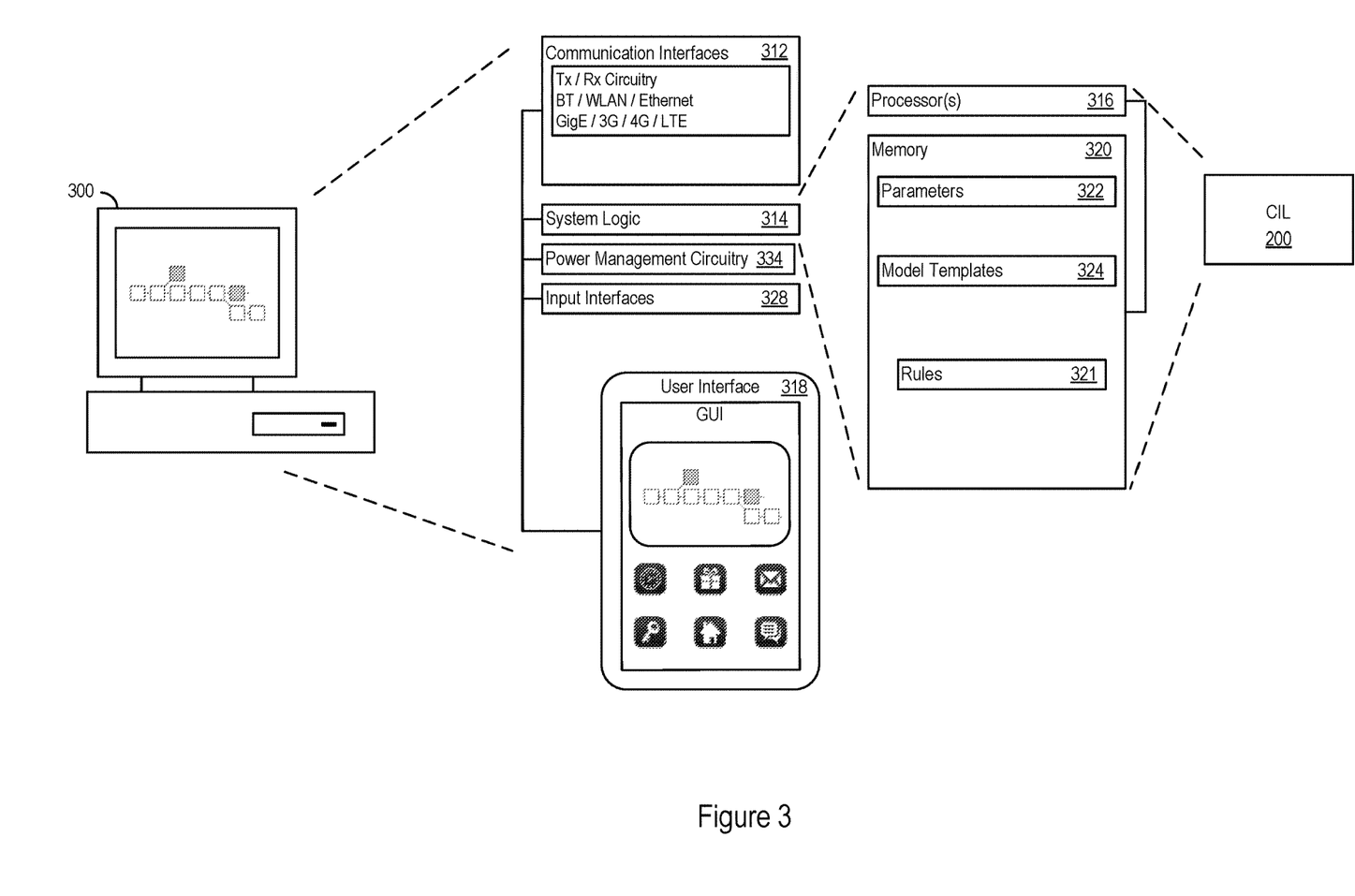
FIG. 3 shows an example causal inference execution environment.

FIG. 3 shows an example causal inference execution environment (CIEE) 300, which may provide an execution environment for implementing the CIS 100. The CIEE 300 may include system logic 314 to support tasks such as estimator comparison, data preparation, data analysis, solution path completion, and/or other tasks discussed. The system logic 314 may include processors 316, memory 320, and/or other circuitry, which may be used to implement CIL 200, which may operate to implement the CIS 100 on the CIEE 300.

The memory 320 may be used to store parameters 322 and/or model templates 324 used in target maximum likelihood calculations and/or other analyses. The memory 320 may further store selection rules 321, which may facilitate designation of covariates, data entries or other selections.

The memory 320 may further include applications and structures, for example, coded objects, templates, or one or more other data structures to support calculations. The CIEE 300 may also include one or more communication interfaces 312, which may support wireless, e.g., Bluetooth, Wi-Fi, WLAN, cellular (3G, 4G, LTE/A), and/or wired, ethernet, Gigabit/multi-Gigabit ethernet, optical networking protocols. The communication interface 312 may support communication, e.g., through the communication layer as network interface circuitry, e.g., with localized operations at various memory locations. Additionally or alternatively, the communication interface 312 may support secure information exchanges, such as secure socket layer (SSL) or public-key encryption-based protocols for sending and receiving private data. The CIEE 300 may include power management circuitry 334 and one or more input interfaces 328.

The CIEE 300 may also include a user interface 318 that may include man-machine interfaces and/or graphical user interfaces (GUI). The GUI may be used to present interfaces, calculation options, input prompts and/or other information to a user interacting with the system.

Example Implementation

Figure 4:
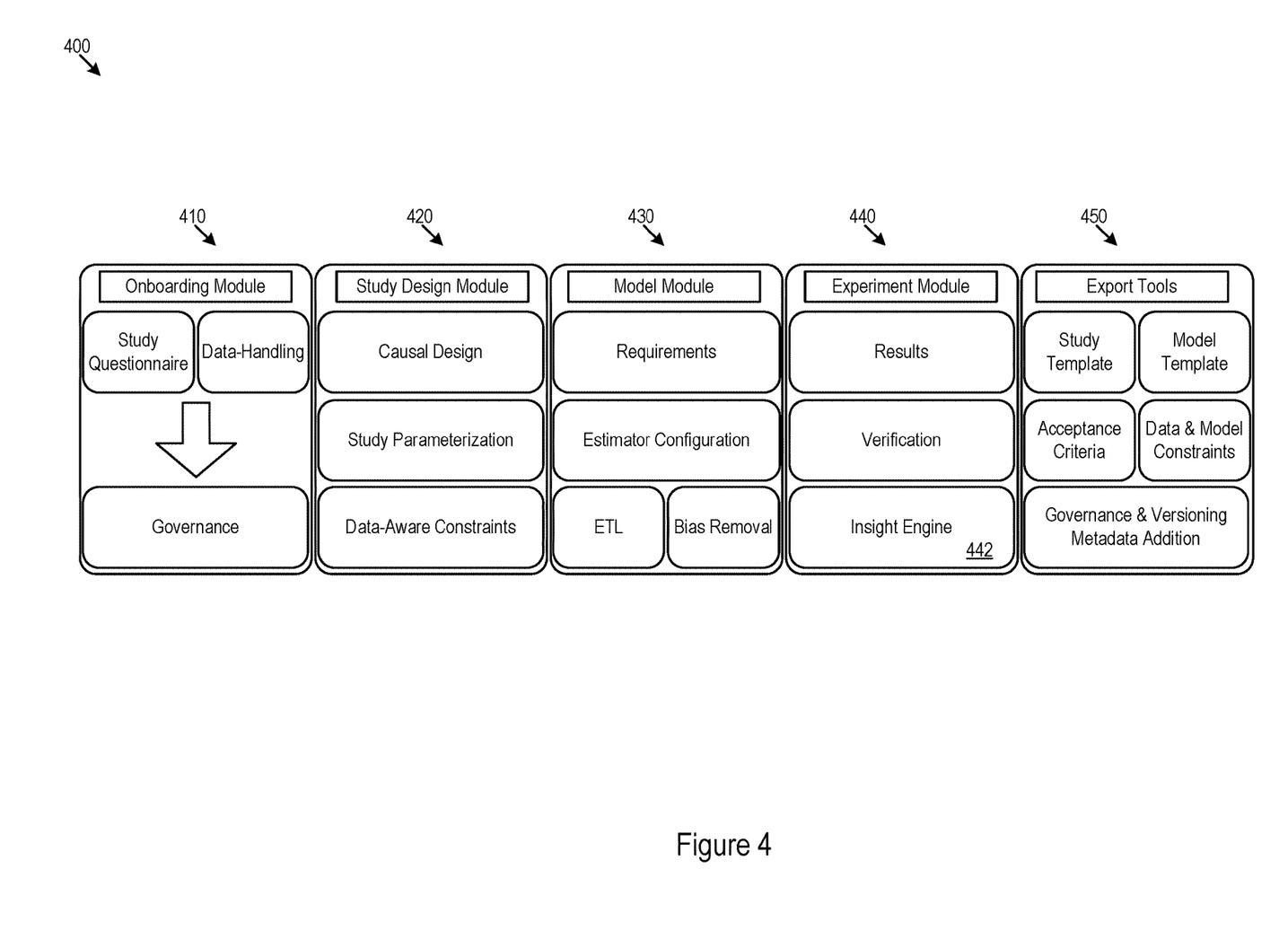
FIG. 4 shows an example computation architecture that may implement the causal inference stack.

FIG. 4 shows an example computation architecture 400 that may implement the CIS 100. The onboarding module 410 may use functionality from the data-handling 110 and pipeline 130 layers discussed above to capture the data dependency query and intake data from the memory locations.

The study design module 420 may utilize data analysis from the data classification layer and study setup from the pipeline layer to characterize and prepare the data while making initial calculation selections.

The model module 430 uses the pipeline layer 130 to finalize and setup the estimator. The data is then loaded for use with the estimator. The model module includes specific extract, transform, load (ETL) functionality to support the estimator by preparing the data in the form that can be digested by the estimator(s). Execution of estimator operates to remove bias (e.g., model the relationship between the covariates, the causal data element, and the outcome element).

The experiment module 440 uses the functionality of the output layer 140 to present output results for the query and verify predicate conditions. The experiment module 440 further includes insight engine processing 442 to provide additional guidance regarding additional potential query and/or suggestions for increasing study robustness or even reducing potential 'bias' in outcome variable.

The computation architecture 400 further includes export tools 450 to facilitate external verification/reproduction, design analysis, and version control.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

E1 In an example, a system includes: network interface circuitry; and causal inference circuitry in data communication with the network interface circuitry and configured to execute a causal inference stack, the causal inference circuitry configured to: at a data-handling layer of the causal inference stack: obtain a memory location for at least a portion of a dataset; establish, for the memory location and via the network interface circuitry, an analysis node for localized data handling; at a data classification layer of the causal inference stack: via hardware-based data-handling operations provided by the data-handling layer, perform a structural data analysis to determine expected entry locations within the dataset; based on an occupancy level for the expected entry locations, determine a missingness metric for the dataset; and based on the missingness metric, determine a randomness classification for missingness of the dataset; at a pipeline layer of the causal inference stack: execute an end-to-end solution path based on a user-generated data element dependency query and the missingness metric, the user-generated data element dependency query including a query whether a first data element measured in the dataset causes, at least in part, a second data element in the dataset; at an output layer of the causal inference stack, generate a first output based a first estimator and on completion of the end-to-end solution path; and at an operational-accuracy layer of the causal inference stack: compare the first output determined based on the first estimator to a second output determined based on a second estimator; and responsive to the second output exceeding the first output on an accuracy performance metric, initiate an installation of a library for execution of the second estimator.

E2 The system of example E1 or any of the other examples, where the randomness classification is based on a distribution characteristic for missing expected entries for the expected entry locations.

E3 The system of example E1 or any of the other examples, where the missingness metric is based on an overall number of missing expected entries for the expected entry locations.

E4 The system of example E1 or any of the other examples, where the expected entry locations a determined based on an organizational structure within the dataset.

E5 The system of example E1 or any of the other examples, where the pipeline layer is further configured to generate an error indicator when the missingness metric fails to support, e.g., is not compatible with, any end-to-end solution path.

E6 The system of example E1 or any of the other examples, where the localized data handling includes privacy policy enforcement.

E7 The system of example E6 or any of the other examples, where the localized data handling is configured to generate a sensitive data notification when private data is identified within the dataset.

E8 The system of example E1 or any of the other examples, where the localized data handling is configured to transform private data into privacy-preserving categorical data.

E9 The system of example E1 or any of the other examples, where the localized data handling is configured to execute a remote worker node at a processor localized to the memory location, the remote worker node configured to coordinate data analysis with the first estimator.

E10 The system of example E1 or any of the other examples, where the first estimator is configured to model a relationship between the first and second data elements, controlling for one or more covariates using a first model, and second estimator is configured to model a relationship between the first and second data elements, controlling for the one or more covariates using a second model different from the first model.

E11 The system of example E1 or any of the other examples, where the end-to-end solution path includes confirmation of a presence of a predicate condition for the first and second data elements.

E12 In an example, a method includes: at causal inference circuitry executing a causal inference stack: at a data-handling layer of the causal inference stack: obtaining a memory location for at least a portion of a dataset; establishing, for the memory location and via network interface circuitry, an analysis node for localized data handling; at a data classification layer of the causal inference stack: performing a structural data analysis to determine expected entry locations within the dataset; based on an occupancy level for the expected entry locations, determining a missingness metric for the dataset; and based on the missingness metric, determining a randomness classification for missingness of the dataset; at a pipeline layer of the causal inference stack: executing an end-to-end solution path based on a user-generated data element dependency query and the missingness metric, the user-generated data element dependency query including a query whether a first data element measured in the dataset causes, at least in part, a second data element in the dataset; at an output layer of the causal inference stack, generating a first output based a first estimator and on completion of the end-to-end solution path; and at an operational-accuracy layer of the causal inference stack: comparing the first output determined based on the first estimator to a second output determined based on a second estimator; and responsive to the second output exceeding the first output on an accuracy performance metric, initiating an installation of a library for execution of the second estimator.

E13 The method of example E12 or any of the other examples, where the localized data handling includes privacy policy enforcement.

E14 The method of example E13 or any of the other examples, where the localized data handling includes generating a sensitive data notification when private data is identified within the dataset.

E15 The method of example E12 or any of the other examples, where the localized data handling includes transforming private data into privacy-preserving categorical data.

E16 The method of example E12 or any of the other examples, where the localized data handling includes executing a remote worker node at a processor localized to the memory location, while the remote worker node coordinates data analysis with the first estimator.

E17 The method of example E12 or any of the other examples, where the first estimator models a relationship between the first and second data elements while controlling for one or more covariates using a first model, and second estimator models a relationship between the first and second data elements while controlling for one or more covariates using a second model different from the first model.

E18 A product including: machine-readable media other than a transitory signal; and instructions stored on the machine-readable media, the instructions configured to, when executed, cause a machine to: at causal inference circuitry configured to execute a causal inference stack: at a data-handling layer of the causal inference stack: obtain a memory location for at least a portion of a dataset; establish, for the memory location and via network interface circuitry, an analysis node for localized data handling; at a data classification layer of the causal inference stack: perform a structural data analysis to determine expected entry locations within the dataset; based on an occupancy level for the expected entry locations, determine a missingness metric for the dataset; and based on the missingness metric, determine a randomness classification for missingness of the dataset; at a pipeline layer of the causal inference stack: execute an end-to-end solution path based on a user-generated data element dependency query and the missingness metric, the user-generated data element dependency query including a query whether a first data element measured in the dataset causes, at least in part, a second data element in the dataset; at an output layer of the causal inference stack, generate a first output based a first estimator and on completion of the end-to-end solution path; and at an operational-accuracy layer of the causal inference stack: compare the first output determined based on the first estimator to a second output determined based on a second estimator; and responsive to the second output exceeding the first output on an accuracy performance metric, initiate an installation of a library for execution of the second estimator.

E19 The product of example E18 or any of the other examples, where the randomness classification is based on a distribution characteristic for missing expected entries for the expected entry locations.

E20 The product of example E12 or any of the other examples, where the missingness metric is based on an overall number of missing expected entries for the expected entry locations.

E21 In an example, a system includes circuitry configured to implement the method of any of examples E1-E11

E22 In an example, a product includes: machine-readable media; and instructions stored on the media configured to cause a machine to perform the method of any of examples E1-E11, where optionally the machine-readable media other than a transitory signal; optionally, the instructions are executable; and optionally, the machine-readable media is non-transitory.

Various implementations have been specifically described. However, many other implementations are also possible.

Headings and/or subheadings used herein are intended only to aid the reader with understanding described implementations.

What is claimed is:

1. A system, including:
   network interface circuitry; and
   causal inference circuitry in data communication with the network interface circuitry and configured to execute a causal inference stack, the causal inference circuitry configured to:
   at a data-handling layer of the causal inference stack:
     obtain a memory location for at least a portion of a dataset;
     establish, for the memory location and via the network interface circuitry, an analysis node for localized data handling;
   at a data classification layer of the causal inference stack:
     via hardware-based data-handling operations provided by the data-handling layer, perform a structural data analysis to determine expected entry locations within the dataset;
     based on an occupancy level for the expected entry locations, determine a missingness metric for the dataset; and
     based on the missingness metric, determine a randomness classification for missingness of the dataset;
   at a pipeline layer of the causal inference stack:
     execute an end-to-end solution path based on a user-generated data element dependency query and the missingness metric, the user-generated data element dependency query including a query whether a first data element measured in the dataset causes, at least in part, a second data element in the dataset, wherein the user-generated data element dependency query is provided by a user probing a relationship between the first data element and the second data element;
     extract one or more covariates from the dataset, based on the user-generated data element dependency query and the missingness metric; and
     select a first estimator for handling the one or more covariates;
   at an output layer of the causal inference stack:
     complete the end-to-end solution path by modeling the one or more covariates, based on the user-generated data element dependency query and the first estimator;
     generate a first output indicating an extent to which a causal relationship exists between the first data element and the second data element based on the first estimator and on completion of the end-to-end solution path; and
   at an operational-accuracy layer of the causal inference stack:
     compare the first output determined based on the first estimator to a second output determined based on a second estimator;
     generate one or more performance metrics based on the comparison; and
     initiate an installation of a library for execution of the second estimator based on the performance metrics.

2. The system of claim 1, where the randomness classification is based on a distribution characteristic for missing expected entries for the expected entry locations, and wherein the randomness classification for missingness of the dataset comprises:
   classification of the missingness of the dataset as missing at random (MAR) for missing entries of data within the dataset with correlations below a threshold value,
   classification of the missingness of the dataset as missing completely at random (MCAR) for uncorrelated missing entries of data within the dataset, and
   classification of the missingness of the dataset as missing not at random (MNAR) for missing entries of data within the dataset with correlations above the threshold.

3. The system of claim 1, where the missingness metric is based on an overall number of missing expected entries for the expected entry locations.

4. The system of claim 1, wherein the expected entry locations are determined based on an organizational structure within the dataset, and wherein the organizational structure corresponds to structural features of a table, and wherein the expected entry locations are determined based on statuses of columns of the table indicating partially filled columns or empty columns.

5. The system of claim 1, where the pipeline layer is further configured to generate an error indicator when the missingness metric lacks compatibility with any end-to-end solution path.

6. The system of claim 1, where the localized data handling includes privacy policy enforcement.

7. The system of claim 6, where the localized data handling is configured to generate a sensitive data notification when private data is identified within the dataset.

8. The system of claim 1, where the localized data handling is configured to transform private data into privacy-preserving categorical data.

9. The system of claim 1, where the localized data handling is configured to execute a remote worker node at a processor localized to the memory location, the remote worker node configured to coordinate data analysis with the first estimator.

10. The system of claim 1, where the first estimator is configured to model a relationship between the first and second data elements while controlling for the one or more covariates using a first model, and the second estimator is configured to model a relationship between the first and second data elements while controlling for another one or more covariates using a second model different from the first model.

11. The system of claim 1, where the end-to-end solution path includes confirmation of a presence of a predicate condition for the first and second data elements.

12. A method including:
    at causal inference circuitry executing a causal inference stack:
      at a data-handling layer of the causal inference stack:
        obtaining a memory location for at least a portion of a dataset;
        establishing, for the memory location and via network interface circuitry, an analysis node for localized data handling;

at a data classification layer of the causal inference stack:
performing a structural data analysis to determine expected entry locations within the dataset;
based on an occupancy level for the expected entry locations, determining a missingness metric for the dataset; and
based on the missingness metric, determining a randomness classification for missingness of the dataset;
at a pipeline layer of the causal inference stack:
executing an end-to-end solution path based on a user-generated data element dependency query and the missingness metric, the user-generated data element dependency query including a query whether a first data element measured in the dataset causes, at least in part, a second data element in the dataset, wherein the user-generated data element dependency query is provided by a user probing a relationship between the first data element and the second data element;
extracting one or more covariates from the dataset, based on the user-generated data element dependency query and the missingness metric; and
selecting a first estimator for handling the one or more covariates;
at an output layer of the causal inference stack:
completing the end-to-end solution path by modeling the one or more covariates, based on the user-generated data element dependency query and the first estimator;
generating a first output indicating an extent to which a causal relationship exists between the first data element and the second data element based on the first estimator and on completion of the end-to-end solution path; and
at an operational-accuracy layer of the causal inference stack:
comparing the first output determined based on the first estimator to a second output determined based on a second estimator;
generating one or more performance metrics based on comparison; and
initiating an installation of a library for execution of the second estimator based on the performance metrics.

13. The method of claim 12, where the localized data handling includes privacy policy enforcement.

14. The method of claim 13, where the localized data handling includes generating a sensitive data notification when private data is identified within the dataset.

15. The method of claim 12, where the localized data handling includes transforming private data into privacy-preserving categorical data honoring the privacy policy.

16. The method of claim 12, where the localized data handling includes executing a remote worker node at a processor localized to the memory location, while the remote worker node coordinates data analysis with the first estimator.

17. The method of claim 12, where the first estimator models a relationship between the first and second data elements while controlling for the one or more covariates using a first model, and the second estimator models a relationship between the first and second data elements while controlling for another one or more covariates using a second model different from the first model.

18. A product including:
machine-readable media other than a transitory signal; and
instructions stored on the machine-readable media, the instructions configured to, when executed, cause a machine to:
at causal inference circuitry configured to execute a causal inference stack:
at a data-handling layer of the causal inference stack:
obtain a memory location for at least a portion of a dataset;
establish, for the memory location and via network interface circuitry, an analysis node for localized data handling;
at a data classification layer of the causal inference stack:
perform a structural data analysis to determine expected entry locations within the dataset;
based on an occupancy level for the expected entry locations, determine a missingness metric for the dataset; and
based on the missingness metric, determine a randomness classification for missingness of the dataset;
at a pipeline layer of the causal inference stack:
execute an end-to-end solution path based on a user-generated data element dependency query and the missingness metric, the user-generated data element dependency query including a query whether a first data element measured in the dataset causes, at least in part, a second data element in the dataset, wherein the user-generated data element dependency query is provided by a user probing a relationship between the first data element and the second data element;
extract one or more covariates from the dataset, based on the user-generated data element dependency query and the missingness metric; and
select a first estimator for handling the one or more covariates;
at an output layer of the causal inference stack:
complete the end-to-end solution path by modeling the one or more covariates, based on the user-generated data element dependency query and the first estimator;
generate a first output indicating an extent to which a causal relationship exists between the first data element and the second data element based on the first estimator and on completion of the end-to-end solution path; and
at an operational-accuracy layer of the causal inference stack:
compare the first output determined based on the first estimator to a second output determined based on a second estimator;
generate an output to performance metrics; and
initiate an installation of a library for execution of the second estimator based on the performance metrics.

19. The product of claim 18, where the randomness classification is based on a distribution characteristic for missing expected entries for the expected entry locations.

20. The product of claim 18, where the missingness metric is based on an overall number of missing expected entries for the expected entry locations.

* * * * *